United States Patent
Lee et al.

(10) Patent No.: US 8,644,254 B2
(45) Date of Patent: Feb. 4, 2014

(54) HANDOVER PROCEDURE AND METHOD AND APPARATUS FOR CONTROLLING TRANSMITTER POWER OF FEMTO BASE STATION IN BROADBAND WIRELESS COMMUNICATION SYSTEM

(75) Inventors: Neung-Hyung Lee, Seoul (KR); Sung-Oh Kwon, Seoul (KR); Jong-In Kim, Gyeonggi-do (KR); Ho-Sun Youm, Seoul (KR)

(73) Assignee: Samsung Electronics Co., Ltd (KR)

( * ) Notice: Subject to any disclaimer, the term of this patent is extended or adjusted under 35 U.S.C. 154(b) by 260 days.

(21) Appl. No.: 13/002,949

(22) PCT Filed: Jul. 7, 2009
(Under 37 CFR 1.47)

(86) PCT No.: PCT/KR2009/003687
§ 371 (c)(1),
(2), (4) Date: Jan. 6, 2011

(87) PCT Pub. No.: WO2010/005217
PCT Pub. Date: Jan. 14, 2010

(65) Prior Publication Data
US 2011/0116476 A1    May 19, 2011

(30) Foreign Application Priority Data

Jul. 7, 2008    (KR) ........................ 10-2008-0065380

(51) Int. Cl.
| | |
|---|---|
| H04B 7/00 | (2006.01) |
| H04Q 7/00 | (2006.01) |
| H04J 3/00 | (2006.01) |
| H04L 9/00 | (2006.01) |
| H04W 36/00 | (2009.01) |
| H04W 24/00 | (2009.01) |

(52) U.S. Cl.
USPC ............... 370/331; 370/336; 370/328; 726/4; 455/522

(58) Field of Classification Search
None
See application file for complete search history.

(56) References Cited

U.S. PATENT DOCUMENTS

| | | | |
|---|---|---|---|
| 6,542,742 B2 | 4/2003 | Schramm et al. | |
| 6,603,971 B1 | 8/2003 | Mohebbi | |

(Continued)

FOREIGN PATENT DOCUMENTS

KR    100665425    12/2006

OTHER PUBLICATIONS

PCT/ISA/237 Written Opinion issued on PCT/KR2009/003687 (4 pp.).

(Continued)

*Primary Examiner* — Andrew Chriss
*Assistant Examiner* — Ajit Reddy
(74) *Attorney, Agent, or Firm* — The Farrell Law Firm, P.C.

(57) ABSTRACT

A method and an apparatus for controlling transmitter power of a femto base station in a broadband wireless communication system are provided. In the method, a femto base station receives a signal having an intensity of a threshold or more from UE and transmits a message reporting power-on of a transmitter to a femto base station controller. The UE transmits a message reporting downlink signal measurement results of femto base stations to the femto base station controller via a macro base station. The femto base station controller determines a femto base station which becomes a handover target of the UE using report messages of the femto base stations and the UE. The femto base station controller transmits a handover procedure start message to the macro base station and the determined femto base station.

16 Claims, 10 Drawing Sheets

(56) References Cited

U.S. PATENT DOCUMENTS

2007/0254620 A1  11/2007  Lindqvist et al.
2009/0042593 A1*  2/2009  Yavuz et al. .................. 455/522
2009/0092097 A1*  4/2009  Nylander et al. ............. 370/331

OTHER PUBLICATIONS

Int'l Search Report PCT/ISA/210 (4 pp.).

* cited by examiner

HANDOVER PROCEDURE AND METHOD AND APPARATUS FOR CONTROLLING TRANSMITTER POWER OF FEMTO BASE STATION IN BROADBAND WIRELESS COMMUNICATION SYSTEM

TECHNICAL FIELD

The present invention relates to a handover procedure, and a method and an apparatus for controlling transmitter power of a femto base station in a broadband wireless communication system. More particularly, the present invention relates to a procedure of a handover to a femto base station, and a method and an apparatus for turning on/off transmitter power of the femto base station according to the handover.

BACKGROUND ART

In a cellular wireless communication system, a channel status is deteriorated due to a geographical factor inside a cell, a distance between User Equipment (UE) and a base station, or movement of the UE, so that communication between the UE and the base station is not promptly performed. More particularly, when the UE is located inside a closed building such as an office or a house, a channel between a base station and the UE is deteriorated, because a shadow region is formed. The UE located in the shadow region cannot promptly perform communication with the base station.

Recently, a femto cell concept is proposed in order to provide a high level data service to more users while solving a service limitation of the indoor shadow region. The femto cell is a small cell area formed by a femto base station (femto eNB or home dNB) which accesses a mobile communication core network via a broadband network installed inside an indoor space. Since the femto cell has a very small cell area compared to a macro cell, a plurality of femto cells may be installed inside one macro cell area.

A macro base station may have interferences from a plurality of femto cells existing inside a cell area of the macro base station. Therefore, to reduce an amount of interference by a femto base station to a macro base station, a conventional art suggests a technique of turning off transmitter power of the femto base station which does not currently provide a service to the UE.

The technique of turning on/off transmitter power of the femto base station is described with reference to FIGS. 1A to 1B. First, when a UE 100 which receives a service from a macro base station 102 as illustrated in FIG. 1A moves and accesses a specific femto base station 104 as illustrated in FIG. 1B, since the femto base station 104 turns off the power of its transmitter but turns on the power of its receiver, the femto base station 104 receives an uplink signal from the UE 100 and measures (step 110) power thereof. At this point, when the power of the measured uplink reception signal has an intensity of a threshold or more, the femto base station 104 turns on the power of the transmitter and transmits control channels to the UE 100 as illustrated in FIG. 1C, and the UE 100 measures the control channel of the femto base station 104, and reports (step 130) measurement results to the macro base station 102 as illustrated in FIG. 1D. The macro base station 102 determines whether to allow a handover of the UE 100. When the handover is required, the macro base station 102 transmits (steps 140 and 142) a handover message to a relevant femto base station 104. At this point, the macro base station 102 identifies the relevant femto base station using a Physical Cell IDentifier (PCID) received from the UE 100. There may exist a plurality of femto base stations having the same PCID inside the cell area of the macro base station 102. Therefore, a handover message of the macro base station 102 is transmitted to a different femto base station 106 having the same PCID as that of the femto base station 104 as illustrated in FIG. 1E.

On the other hand, when the handover of the UE is not required, the macro base station 102 does not take a special measure for the femto base station 104. Therefore, the femto base station 104 stands by for a predetermined time until a timer expires, and turns off (160) the power of the transmitter as illustrated in FIG. 1F. That is, the femto base station 104 turns on the power of the transmitter and operates the timer, and when an event for a handover does not occur for the predetermined time, turns off the power of the transmitter.

As described above, according to the conventional art, a femto base station manages the power on/off of the transmitter by operating the timer. Therefore, even when a handover to the femto base station does not occur, the femto base station stands by with the power of its transmitter turned on until the timer expires, so that an interference may be generated to a neighbor macro base station.

Also, since the UE reports only a PCID to the macro base station while reporting the measurement results, the macro base station cannot exactly recognize a femto base station to which the UE is to perform a handover and thus transmits handover messages to even the other femto base stations except the relevant femto base station to which the UE is to perform the handover. Accordingly, the power of transmitters of unnecessary femto base stations is turned on.

The above-described conventional technique of controlling the transmitter power of a femto base station unnecessarily turns on the transmitter power, and requires a long time until the transmitter power is turned off, so that a large amount of interference may be still generated to a macro base station.

DISCLOSURE OF INVENTION

Technical Solution

An aspect of the present invention is to address at least the above mentioned problems and/or disadvantages and to provide at least the advantages described below. Accordingly, an aspect of the present invention is to provide a handover procedure and a method and an apparatus for controlling transmitter power of a femto base station in a broadband wireless communication system.

Another aspect of the present invention is to provide a method and an apparatus for identifying a femto base station as a handover target of a User Equipment (UE) during a handover of the UE in a broadband wireless communication system.

Still another aspect of the present invention is to provide a method and an apparatus for turning off fast transmitter power of femto base stations which are not handover targets during a handover of a UE in a broadband wireless communication system.

In accordance with an aspect of the present invention, a method of a femto base station, for controlling transmitter power of the femto base station in a broadband wireless communication system is provided. The method includes receiving a signal having intensity of a threshold or more from User Equipment (UE), and turning on power of a transmitter of the femto base station, transmitting a power-on report message reporting power-on of the transmitter to a femto base station controller, and receiving a handover request message or a transmitter power off indicate message from the femto base station controller.

In accordance with another aspect of the present invention, a method of a femto base station controller, for controlling transmitter power of a femto base station in a broadband wireless communication system is provided. The method includes receiving a message reporting that power of a transmitter of the femto base station is turned-on by predetermined UE from the femto base station, receiving a message reporting downlink measurement results of femto base stations from the UE via a macro base station, generating a handover candidate base station list using Physical Cell IDentifiers (PCIDs) included in report messages of femto base stations and the UE, determining, as a handover target base station, a femto base station having a Global Cell IDentifier (GCID) corresponding to a Closed Subscriber Group (CSG) of the UE among femto base stations included in the handover candidate base station list, and transmitting a handover procedure start message to the macro base station and the determined femto base station.

In accordance with still another aspect of the present invention, a method of UE, for controlling transmitter power of a femto base station in a broadband wireless communication system is provided. The method includes measuring downlink signals of femto base stations, and transmitting a measurement result report message reporting measurement results to a femto base station controller via a macro base station, wherein the measurement result report message includes at least one of PCIDs of the femto base stations, and a GCID of femto base stations corresponding to a CSG of the UE.

In accordance with yet another aspect of the present invention, a method of a macro base station, for controlling transmitter power of a femto base station in a broadband wireless communication system is provided. The method includes receiving a report message reporting downlink signal measurement results of femto base stations from UE, determining whether the report message is information regarding a femto base station using a PCID, when the report message is the information regarding the femto base station, transmitting the report message to a femto base station controller, and receiving a handover procedure start message from the femto base station controller.

In accordance with further another aspect of the present invention, an apparatus of a femto base station, for controlling transmitter power of a femto base station in a broadband wireless communication system is provided. The apparatus includes a receiver for receiving a signal from UE or a femto base station controller, a transmitter for transmitting a signal to the UE or the femto base station controller, power of the transmitter being turned on/off, and a controller for turning on the power of the transmitter when a signal having intensity of a threshold or more is received from the UE via the receiver, transmitting a power-on report message reporting power-on of the transmitter to the femto base station controller, and when a transmitter power off indicate message is received from the femto base station controller, turning off the power of the transmitter.

In accordance with yet further another aspect of the present invention, an apparatus of a femto base station controller, for controlling transmitter power of a femto base station in a broadband wireless communication system is provided. The apparatus includes a receiver for receiving a message reporting that power of a transmitter of the femto base station is turned on by predetermined UE from the femto base station, and receiving a message reporting downlink measurement results of femto base stations from the UE via a macro base station, a controller for generating a handover candidate base station list using PCIDs included in report messages of femto base stations and the UE, and determining, as a handover target base station, a femto base station having a GCID corresponding to a CSG of the UE among femto base stations included in the handover candidate base station list, and a transmitter for transmitting a handover procedure start message to the macro base station and the determined femto base station.

In accordance with still further another aspect of the present invention, an apparatus of UE, for controlling transmitter power of a femto base station in a broadband wireless communication system is provided. The apparatus includes a receiver for measuring downlink signals of femto base stations, and a controller for performing control to generate a measurement result report message reporting measurement results and transmit the measurement result report message to a femto base station controller via a macro base station, wherein the measurement result report message includes at least one of PCIDs of the femto base stations, and a GCID of femto base stations corresponding to a CSG of the UE.

In accordance with further yet another aspect of the present invention, an apparatus of a macro base station, for controlling transmitter power of a femto base station in a broadband wireless communication system is provided. The apparatus includes a receiver for receiving a measurement result report message reporting downlink signal measurement results of femto base stations from UE, and receiving a handover procedure start message from a femto base station controller, a controller for determining whether the measurement result report message is information regarding a femto base station using a PCID, and a transmitter for, when the measurement result report message is the information regarding the femto base station, transmitting the measurement result report message received from the UE to the femto base station controller under control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the following description taken in conjunction with the accompanying drawings in which.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for identifying a femto base station as a handover target of a User Equipment (UE) using a measurement result report message of the UE and a report message of a femto base station (femto eNB or home eNB) during a handover of the UE, and turning off fast the power of the other femto base stations which are not the handover target in a broadband wireless communication system. Hereinafter, an Orthogonal Frequency Division Multiplexing (OFDM) system is illustrated by way of example and exemplary embodiments of the present invention are also applicable to communication systems using a different communication scheme.

Figure 1:
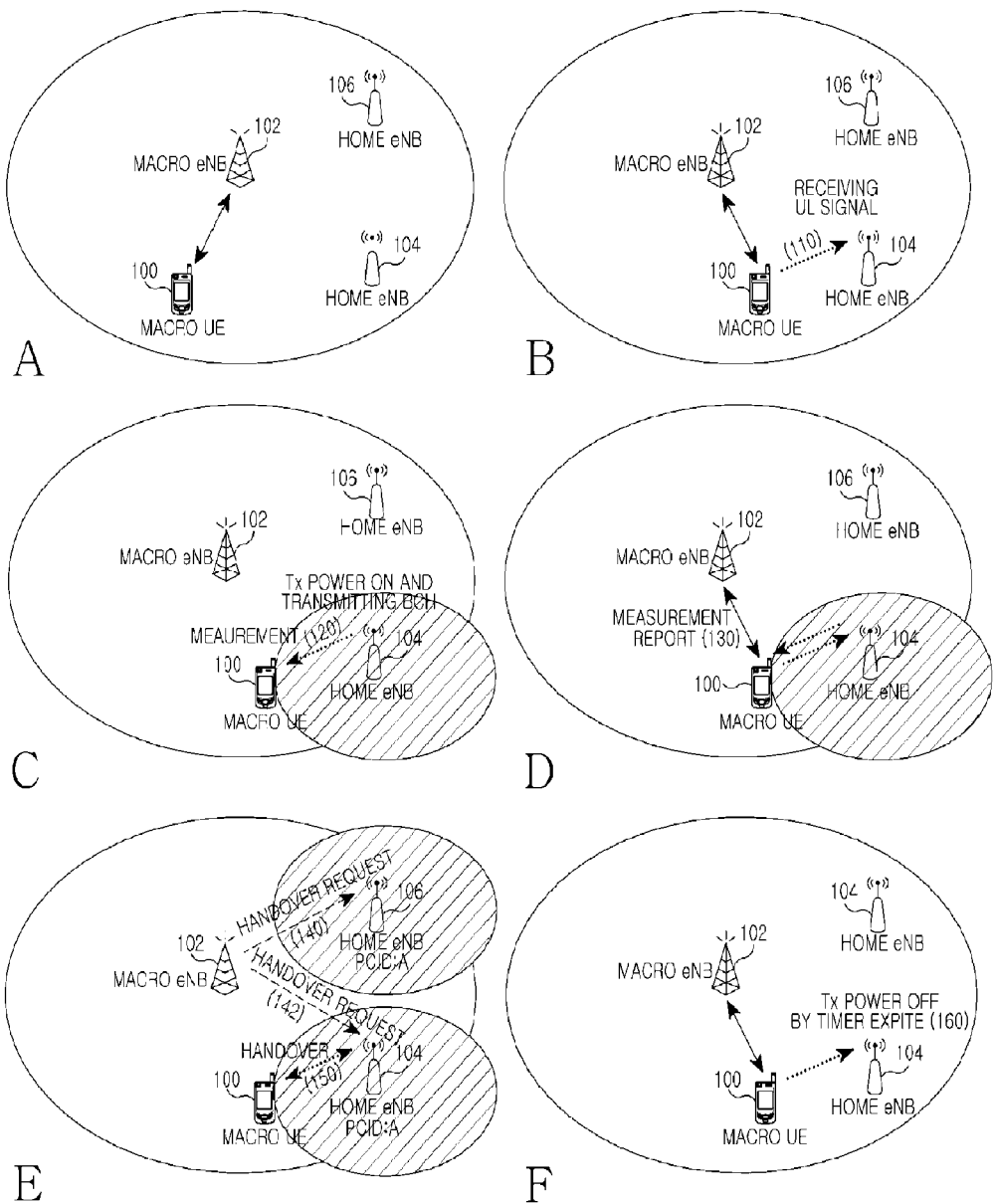
FIGS. 1A to 1F are views illustrating a technique of controlling transmitter power of a femto base station in a broadband wireless communication system according to a conventional art.
Figure 2:
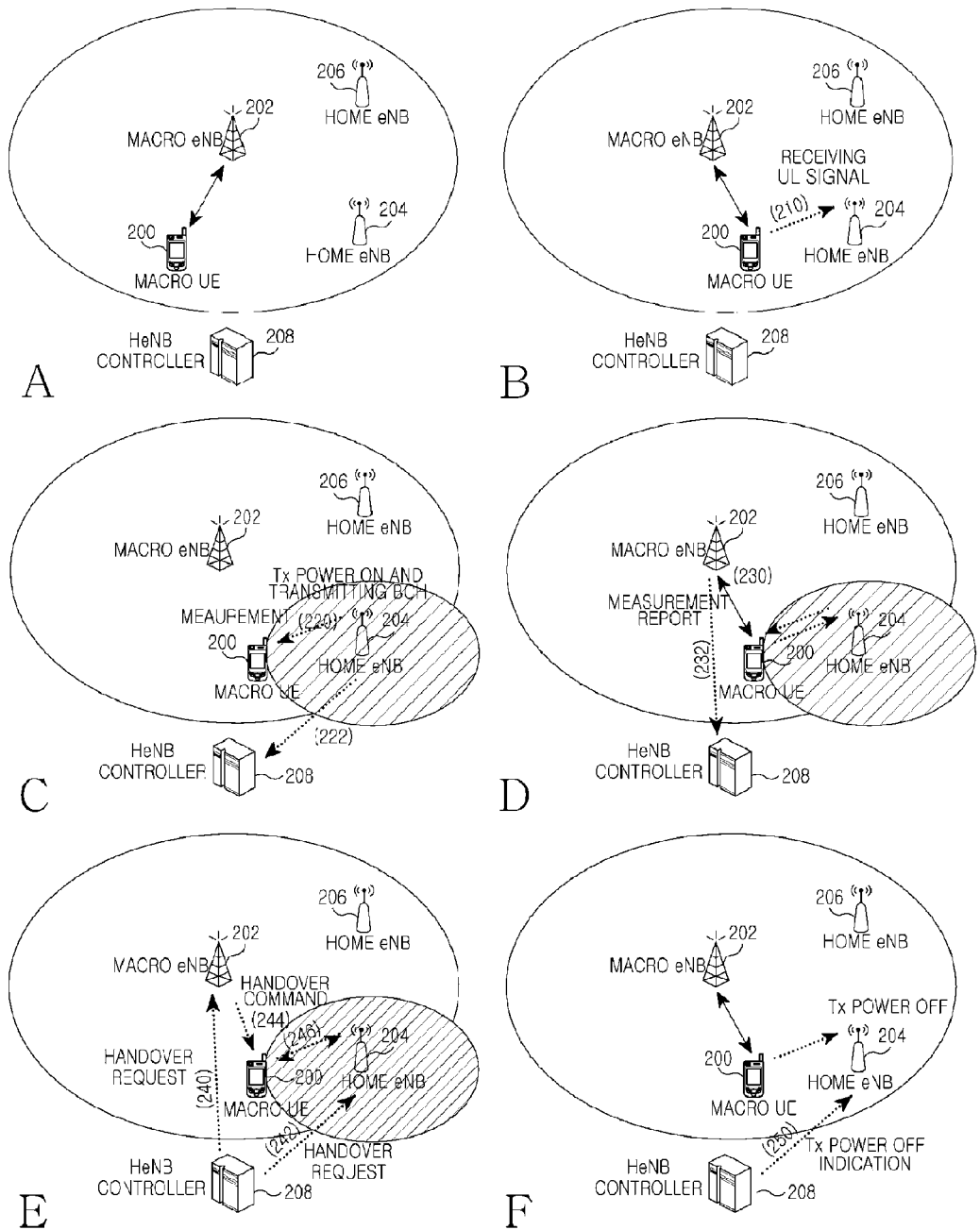
FIGS. 2A to 2F are views illustrating a handover procedure and a technique of controlling transmitter power of a femto base station in a broadband wireless communication system according to an exemplary embodiment of the present invention.

FIGS. 2A to 2B are views illustrating a handover procedure and a technique of controlling transmitter power of a femto base station in a broadband wireless communication system according to an exemplary embodiment of the present invention.

Referring to FIGS. 2A to 2B, the broadband wireless communication system includes UE 200, a macro base station (macro eNB) 202, femto base stations (home eNB) 204 and 206, and a femto base station controller (home eNB controller) 208.

First, as illustrated in FIG. 2A, when the UE 200 which receives a service from the macro base station 202 moves and accesses the specific femto base station 204 as illustrated in FIG. 2B, the specific femto base station 204 measures (step 210) an uplink signal reception intensity of the UE 200 via its receiver in a power-on state.

At this point, when the measured uplink signal reception intensity is a threshold or more, the femto base station 204 turns on the power of its transmitter and broadcasts (step 220) control information via a Broadcast CHannel (BCH) as illustrated in FIG. 2C, and reports (step 222) that the power of the transmitter is turned on by the UE 200 to the femto base station controller 208 according to an exemplary embodiment of the present invention. At this point, a message reporting that the power of the transmitter is turned on includes a PCID and a GCID of the femto base station 204.

After that, as illustrated in FIG. 2D, the UE 200 measures a BCH of the femto base station 204, and transmits (step 230) a measurement result report message reporting a measurement result to the macro base station 202. The macro base station 202 transmits the measurement result report message received from the UE 200 to the femto base station controller 208 according to an exemplary embodiment of the present invention. At this point, the measurement result report message includes PCIDs of femto base stations measured by the UE 200 and a GCID of femto base stations belonging to a CSG of the UE 200. Here, the CSG is a set including femto base stations which the UE itself may access.

The femto base station controller 208 determines whether to allow a handover of the UE 200 using a power-on report message received from the femto base station 204, and the measurement result report message received from the macro base station 202. When a handover is needed, the femto base station controller 208 transmits (steps 240 and 242) a handover request message for a handover procedure start to the macro base station 202 and the femto base station 204 to induce a handover of the UE 200 to the femto base station 204 as illustrated in FIG. 2E. At this point, the femto base station controller 208 determines a femto base station to which a handover is to be made using the measurement result report message received from the UE 200 via the macro base station 202, and power-on report messages received from the femto base stations according to an exemplary embodiment of the present invention. This procedure is described with reference to FIGS. 3 and 4.

On the other hand, when the handover of the UE is not needed, the femto base station controller 208 transmits a message indicating transmitter power off to the femto base station 204 as illustrated in FIG. 2F. Accordingly, when a handover to the femto base station 204 is not performed, the femto base station 204 may turn off the transmitter power without waiting until a timer expires.

Now, the handover procedure and the technique of controlling transmitter power are described in more detail with reference to FIGS. 3 to 5.

Figure 3:
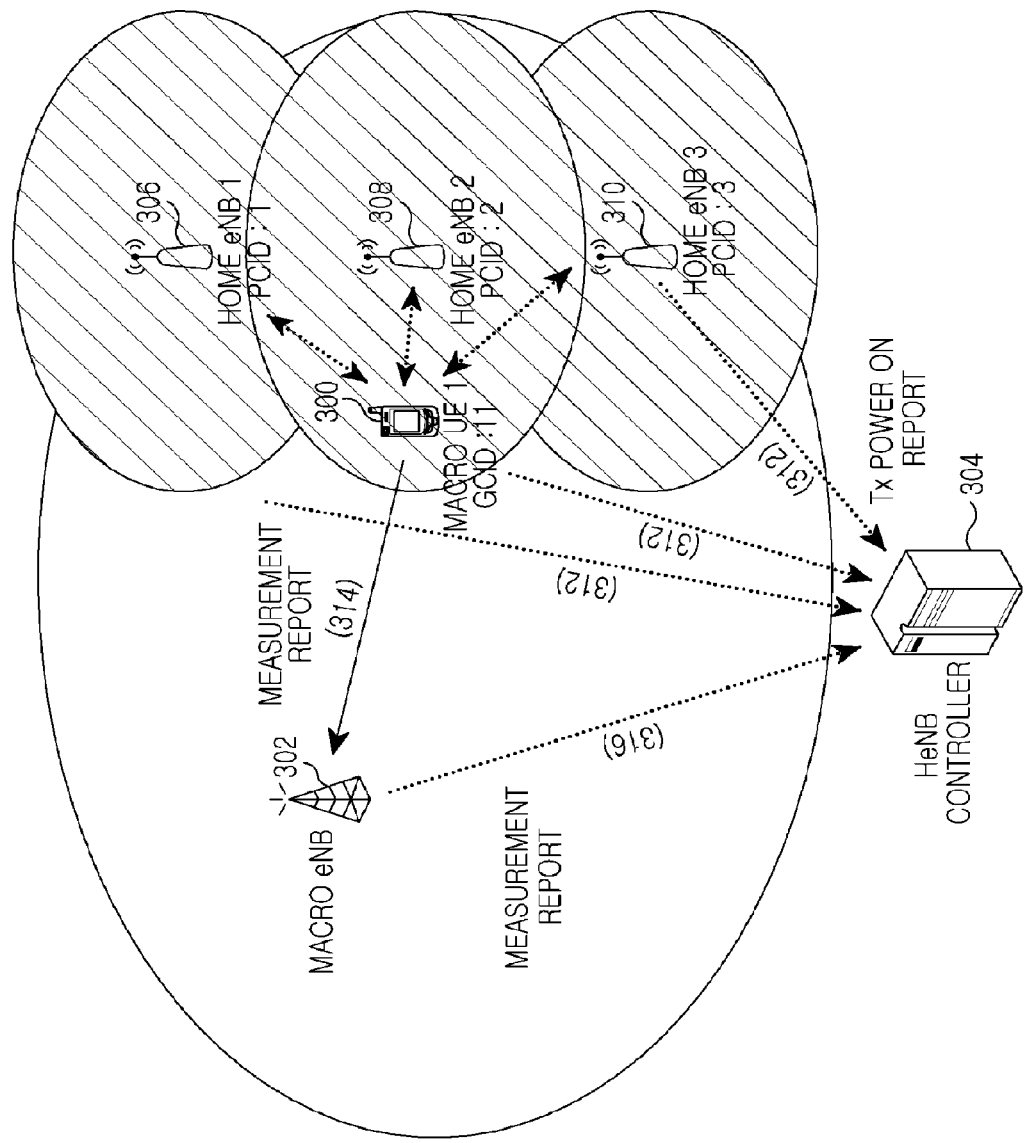
FIG. 3 is a view illustrating a system construction for obtaining, at a femto base station controller, information for a handover of a User Equipment (UE) according to an exemplary embodiment of the present invention.
Figure 4:
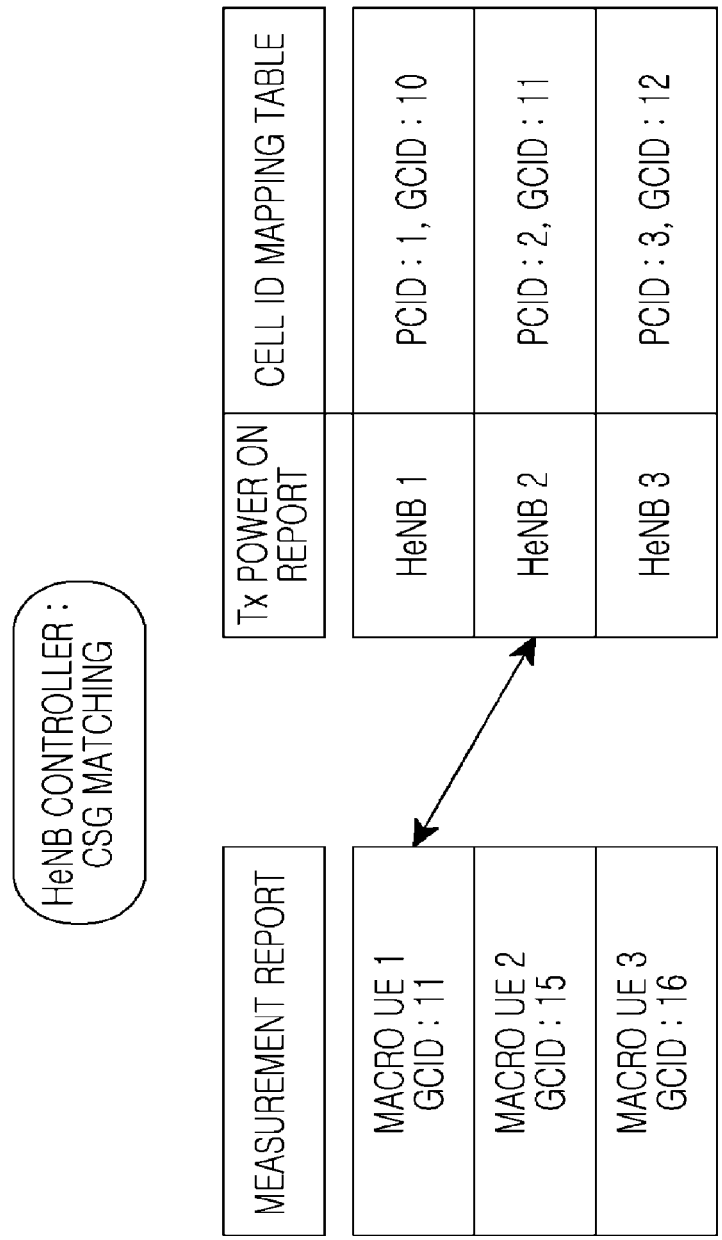
FIG. 4 is a view illustrating a mapping table for searching for a handover target base station of a UE at a femto base station controller according to an exemplary embodiment of the present invention.

FIG. 3 is a view illustrating a system construction for obtaining, at a femto base station controller, information for a handover of UE according to an exemplary embodiment of the present invention.

Referring to FIG. 3, when the intensity of a reception signal becomes a threshold or more as UE 300 moves, each of femto base stations 1, 2, and 3 (home eNBs 1, 2, and 3) (306, 308, and 310) turns on power of its transmitter, broadcasts system control information via a Broadcast Channel (BCH), and transmits a message reporting the power-on of the transmitter to a femto base station controller 304 in step 312. At this point, the message reporting the power-on of the transmitter includes a PCID and a GCID of each femto base station.

The UE 300 measures BCHs of the femto base stations 306, 308, and 310, and in step 314, transmits a measurement result report message reporting measurement results to a macro base station 302. In step 316, the macro base station transmits the measurement result report message received from the UE 300 to the femto base station controller 304. At this point, the measurement result report message includes PCIDs of the femto base stations 306, 308, and 310 measured by the UE 300, and a GCID of femto base stations belonging to a CSG of the UE 300.

The femto base station controller 304 detects the PCIDs included in the measurement result report message, and forms a handover candidate list by selecting the femto base stations 306, 308, and 310 having the same PCIDs as the PCIDs included in the measurement result report message from femto base stations which are currently powered on. Also, the femto base station controller 304 detects a GCID belonging to the CSG of the UE from the measurement result report message, and searches for the femto base station 308 having the same GCID as the GCID included in the measurement result report message from the femto base stations 306, 308, and 310 included in the handover candidate list to determine the relevant femto base station 308 as a handover target base station. For example, as illustrated in FIG. 4, in the case where the measurement result report message received from the UE 1 (300) includes 1, 2, and 3 as PCIDs, and 11 as a GCID of the UE 1 (300), the femto base station controller 304 forms a handover candidate list by searching for femto base stations whose PCIDs are 1, 2, or 3 from femto base stations stored in advance, and selects the femto base station 2 (308) having a GCID of 11 as the handover target base station of the UE 300 from the formed handover candidate list. Here, the femto base station controller 304 stores in advance information of femto base stations which have transmitted transmitter power-on report messages before the measurement result report message is received.

Now, a handover procedure after the femto base station controller selects a handover target base station, and transmitter power control of a femto base station are described in detail.

Figure 5:
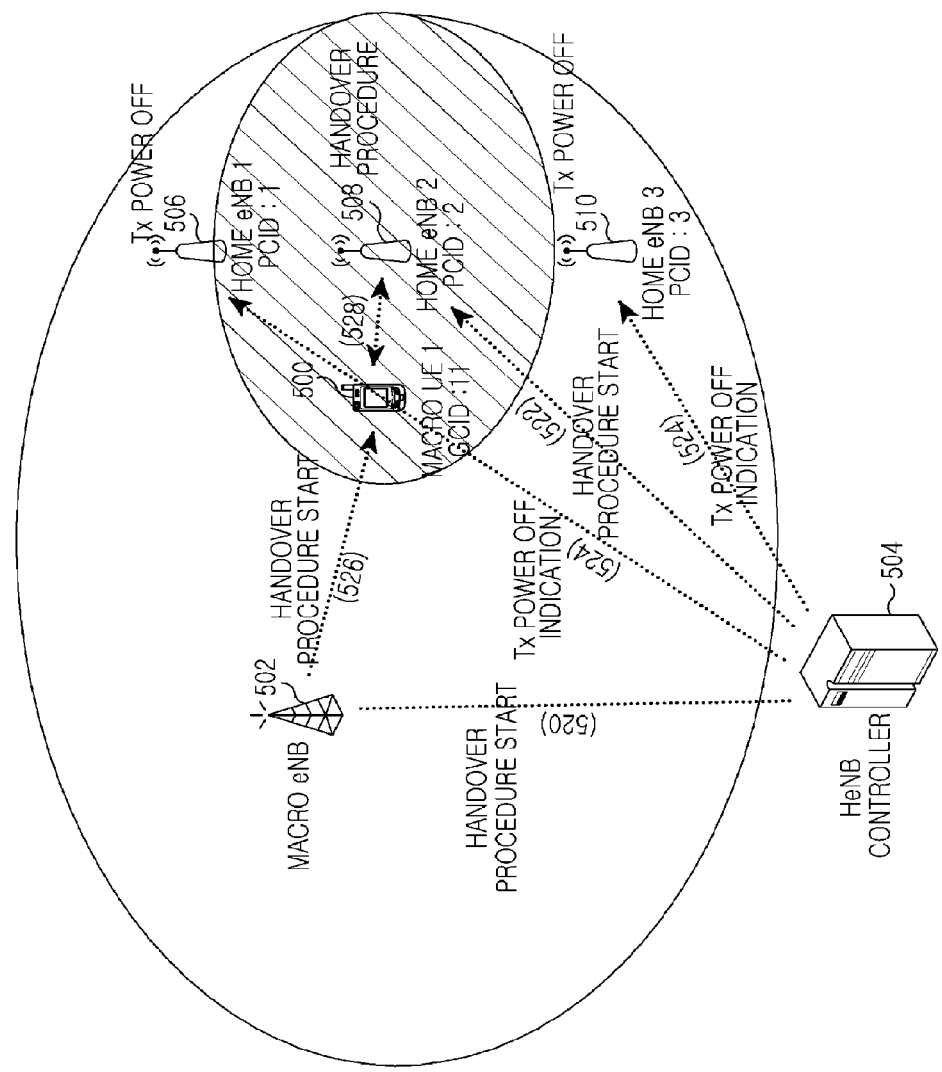
FIG. 5 is a view illustrating a system construction for controlling, at a femto base station controller, a handover and a transmitter power on/off of a femto base station according to an exemplary embodiment of the present invention.

FIG. 5 is a view illustrating a system construction for controlling, at a femto base station controller, a handover and a transmitter power on/off of a femto base station according to an exemplary embodiment of the present invention.

Referring to FIG. 5, in steps 520 and 522, the femto base station controller 504 which has determined a handover target base station transmits a handover request message for a handover procedure start to a macro base station 502 and a relevant femto base station 508, and in step 524, transmits a message indicating transmitter power off to the other femto base stations 506 and 510. UE 500 which has received a handover procedure start message from the macro base station 502 in step 526 performs a handover procedure with the femto base station 508 which is the handover target base station in step 528. The other femto base stations 506 and 510 which do not perform a handover turn off their transmitter power.

Figure 6:
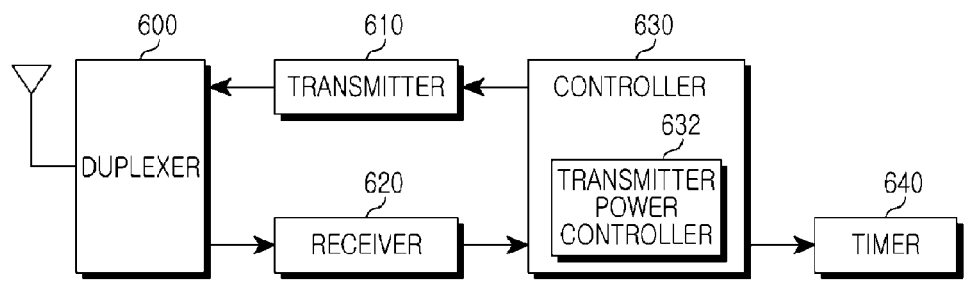
FIG. 6 is a block diagram illustrating a femto base station in a broadband wireless communication system according to an exemplary embodiment of the present invention.

FIG. 6 is a block diagram illustrating a femto base station in a broadband wireless communication system according to an exemplary embodiment of the present invention.

Referring to FIG. 6, the femto base station includes a duplexer 600, a transmitter 610, a receiver 620, a controller 630, and a timer 640. The controller 630 includes a transmission power controller 632.

The duplexer 600 transmits a transmission signal provided from the transmitter 610 via an antenna, and provides a reception signal from the antenna to the receiver 620 according to a duplexing scheme.

The transmitter 610 converts a transmission signal to a Radio Frequency (RF) signal, and provides the RF signal to the duplexer 600 under control of the controller 630. For example, in the case where the wireless communication system uses an Orthogonal Frequency Division Multiplexing (OFDM) scheme, the transmitter 610 includes an encoder, an OFDM modulator, a Digital/Analog Converter (DAC), and an RF processor. Particularly, the power of the transmitter 610 is turned on/off under control of the controller 630.

The receiver 620 converts a reception signal provided from the duplexer 600 to a baseband signal, and provides the baseband signal to the controller 630. For example, when the wireless communication system uses an OFDM scheme, the receiver 620 includes an RF processor, an Analog/Digital Converter (ADC), an OFDM demodulator, and a decoder.

The controller 630 controls an overall operation of the femto base station, and particularly, includes the transmission power controller 632 according to an exemplary embodiment of the present invention. When a received intensity of an uplink signal received from UE is a threshold or more, the controller 630 turns on the power of the transmitter 610, transmits a control channel, and controls and processes a function for transmitting a message reporting the power-on of the transmitter to a femto base station controller. Also, when turning on the power of the transmitter 610, the controller 630 operates the timer 640. When the timer 640 measures a predetermined duration and expires, the controller 630 controls and processes a function for turning off the power of the transmitter 610. Also, when a handover procedure start message is received from the femto base station controller, the controller 630 terminates the operation of the timer 640, performs a process and a control for a handover procedure, and when a transmitter power off message is received from the femto base station controller, terminates the timer 640 and turns off the power of the transmitter 610.

The timer 640 measures the predetermined duration under control of the controller 630. At this point, the timer 640 starts its operation when the power of the transmitter 610 is turned on, and measures the predetermined duration in order to turn off the power of the transmitter 610 under control of the controller 630.

Figure 7:
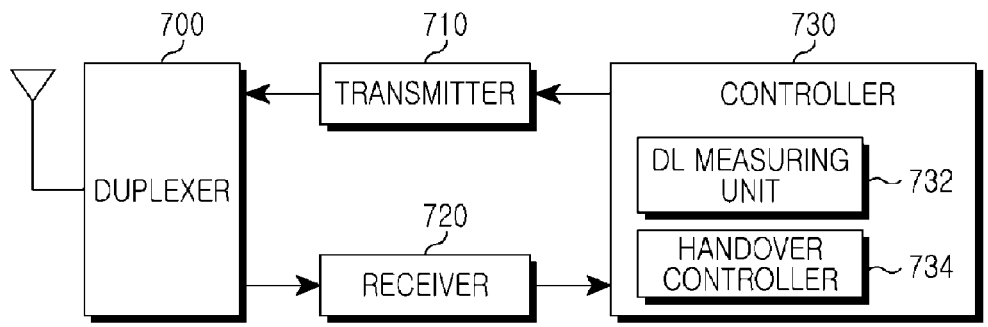
FIG. 7 is a block diagram illustrating a UE in a broadband wireless communication system according to an exemplary embodiment of the present invention.

FIG. 7 is a block diagram illustrating UE in a broadband wireless communication system according to an exemplary embodiment of the present invention.

Referring to FIG. 7, the UE includes a duplexer 700, a transmitter 710, a receiver 720, and a controller 730. The controller 730 includes a DownLink (DL) measuring unit 732 and a handover controller 734.

The duplexer 700 transmits a transmission signal provided from the transmitter 710 via an antenna, and provides a reception signal from the antenna to the receiver 720 according to a duplexing scheme.

The transmitter 710 converts a transmission signal to an RF signal, and provides the RF signal to the duplexer 700 under control of the controller 730. For example, in the case where the wireless communication system uses an OFDM scheme, the transmitter 710 includes an encoder, an OFDM modulator, a DAC, and an RF processor.

The receiver 720 converts a reception signal provided from the duplexer 700 to a baseband signal, and provides the baseband signal to the controller 730. For example, in the case where the wireless communication system uses an OFDM scheme, the receiver 720 includes an RF processor, an ADC, an OFDM demodulator, and a decoder.

The controller 730 controls an overall operation of the UE, and particularly, includes the DL measuring unit 732. Accordingly, the controller 730 controls and processes a function of measuring a downlink signal from control channels of neighbor base stations, and transmitting a measurement result report message reporting a measurement result to a macro base station which is a current serving base station. At this point, the measurement result report message includes PCIDs of the neighbor base stations and a GCID of femto base stations belonging to a CSG of the UE.

Also, the controller 730 includes the handover controller 734 to control and process a procedure for performing a handover to a relevant femto base station when a handover procedure start message is received from the macro base station which is the serving base station.

Figure 8:
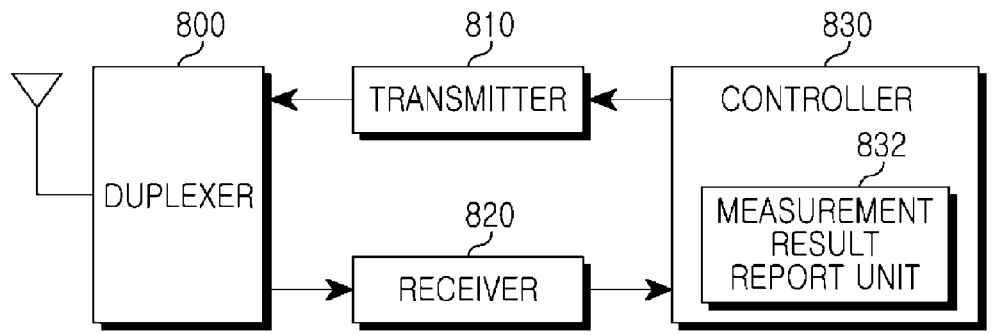
FIG. 8 is a block diagram illustrating a macro base station in a broadband wireless communication system according to an exemplary embodiment of the present invention.

FIG. 8 is a block diagram illustrating a macro base station in a broadband wireless communication system according to an exemplary embodiment of the present invention.

Referring to FIG. 8, the macro base station includes a duplexer 800, a transmitter 810, a receiver 820, and a controller 830. The controller 830 includes a measurement result report unit 832.

The duplexer 800 transmits a transmission signal provided from the transmitter 810 via an antenna, and provides a reception signal from the antenna to the receiver 820 according to a duplexing scheme.

The transmitter 810 converts a transmission signal to an RF signal, and provides the RF signal to the duplexer 800 under control of the controller 830. For example, in the case where the wireless communication system uses an OFDM scheme, the transmitter 810 includes an encoder, an OFDM modulator, a DAC, and an RF processor.

The receiver 820 converts a reception signal provided from the duplexer 800 to a baseband signal, and provides the baseband signal to the controller 830. For example, in the case where the wireless communication system uses an OFDM scheme, the receiver 820 includes an RF processor, an ADC, an OFDM demodulator, and a decoder.

The controller 830 controls an overall operation of the macro base station, and particularly, includes the measurement result report unit 832. Accordingly, when a measurement result report message of a neighbor base station is received from UE to which the macro base station currently provides a service, the controller 830 of the macro base station detects a PCID from the message and determines whether the PCID corresponds to a femto base station. When the PCID corresponds to the femto base station as a result of the determination, the controller 830 controls and processes a function for transmitting the measurement result report message to a femto base station controller. Also, when a handover procedure start message is received from the femto base station controller, the controller 830 controls and processes a function for transmitting a message for performing a handover procedure to the UE.

Figure 9:
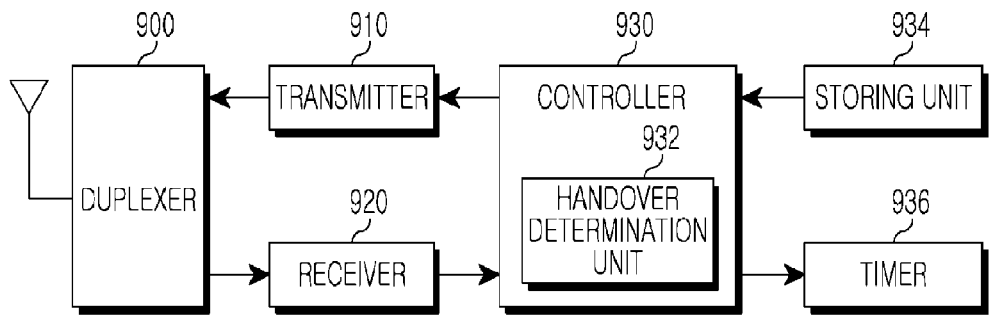
FIG. 9 is a block diagram illustrating a femto base station controller in a broadband wireless communication system according to an exemplary embodiment of the present invention.

FIG. 9 is a block diagram illustrating a femto base station controller in a broadband wireless communication system according to an exemplary embodiment of the present invention.

Referring to FIG. 9, the femto base station controller includes a duplexer 900, a transmitter 910, a receiver 920, a controller 930, a storing unit 934, and a timer 936. The controller 930 includes a handover determination unit 932.

The duplexer 900 transmits a transmission signal provided from the transmitter 910 via an antenna, and provides a reception signal from the antenna to the receiver 920 according to a duplexing scheme.

The transmitter 910 converts a transmission signal to an RF signal, and provides the RF signal to the duplexer 900 under control of the controller 930. For example, in the case where the wireless communication system uses an OFDM scheme, the transmitter 910 includes an encoder, an OFDM modulator, a DAC, and an RF processor.

The receiver 920 converts a reception signal provided from the duplexer 900 to a baseband signal, and provides the baseband signal to the controller 930. For example, in the case where the wireless communication system uses an OFDM scheme, the receiver 920 includes an RF processor, an ADC, an OFDM demodulator, and a decoder.

The controller 930 controls an overall operation of the femto base station controller. When power-on report messages by specific UE are received from femto base stations, the controller 930 operates the timer 936, analyzes the power-on report messages, and controls and processes a function for storing information (for example, PCIDs and GCIDs) regarding femto base stations which are currently powered on in the storing unit 934. Particularly, the controller 930 includes the handover determination unit 932 to terminate the operation of the timer 936 upon reception of a measurement result report message from the specific UE via the macro base station, detect PCIDs from the measurement result report message, and form a handover candidate base station list by searching for femto base stations corresponding to the detected PCIDs from the femto base stations which are currently powered-on and stored in the storing unit 934. After that, the controller 930 detects a GCID belonging to a CSG of the UE from the measurement result report message using the handover determination unit 932, and then searches for a femto base station corresponding to the GCID from the femto base stations included in the handover candidate base station list to determine a relevant femto base station as a handover target base station.

After that, the controller 930 transmits a handover request message for a handover procedure start to the macro base station and the femto base station determined as the handover target base station, and controls and processes a function for transmitting a transmitter power off indicate message to the other femto base stations which are currently powered on by the UE.

Also, when the timer 936 expires without reception of the measurement result report message from the specific UE via the macro base station, the controller 930 controls and processes a function for transmitting a transmitter power off indicate message to the femto base stations which have transmitted the power-on report messages.

The storing unit 934 stores programs for an overall operation of the femto base station controller, and various data, and stores information (for example, PCIDs and GCIDs) regarding the femto base stations which are currently powered on under control of the controller 930.

The timer 936 measures predetermined duration under control of the controller 930. The timer 936 starts its operation upon reception of a power-on report message by the specific UE, and terminates its operation upon reception of a measurement result report message from the specific UE via the macro base station under control of the controller 930.

Figure 10:
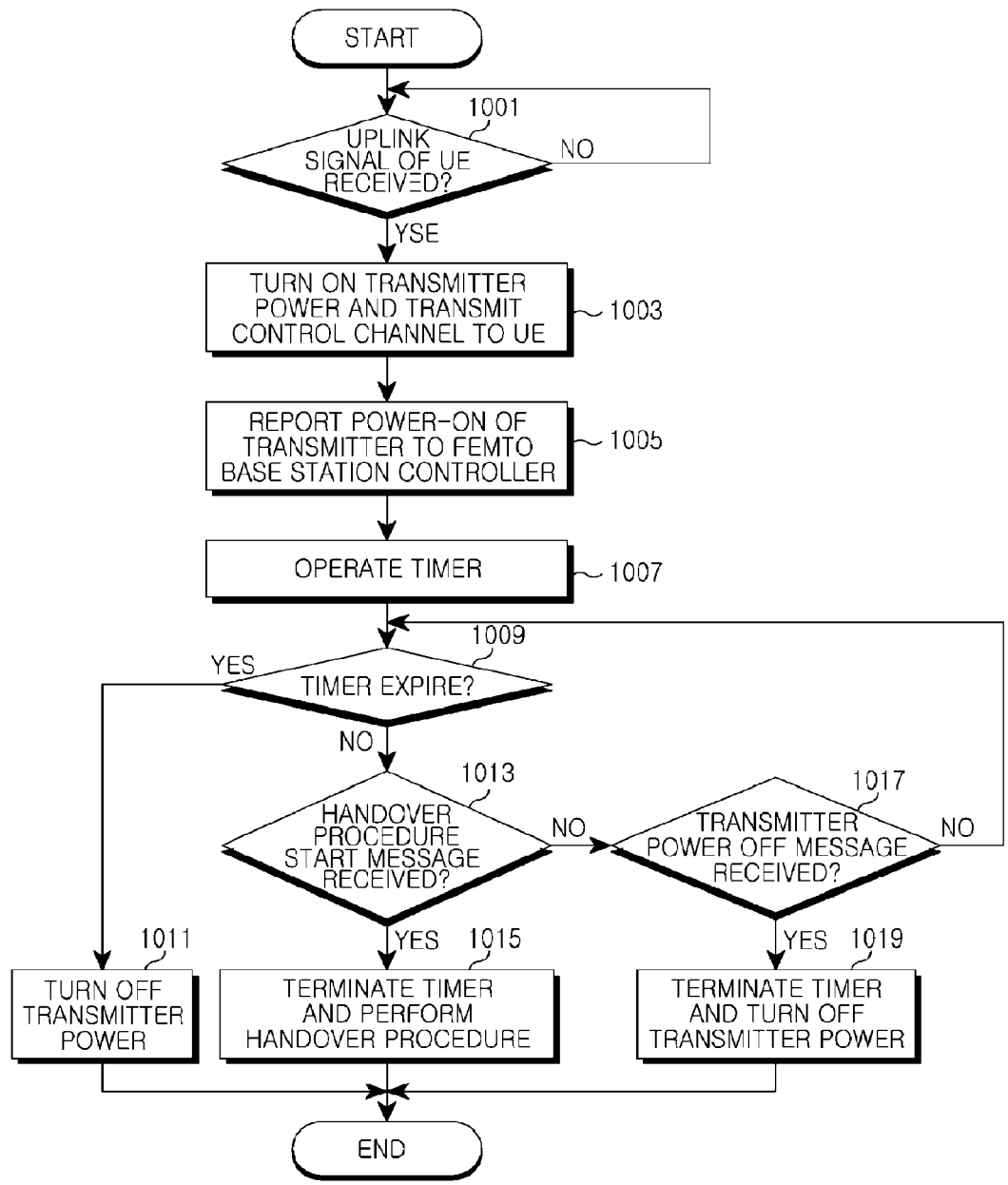
FIG. 10 is a flowchart illustrating an operation procedure of a femto base station in a broadband wireless communication system according to an exemplary embodiment of the present invention.

FIG. 10 is a flowchart illustrating an operation procedure of a femto base station in a broadband wireless communication system according to an exemplary embodiment of the present invention.

Referring to FIG. 10, when an uplink signal having intensity of a threshold or more is received from UE in step 1001, the femto base station turns on its transmitter power and transmits a control channel to the UE in step 1003.

In step 1005, the femto base station transmits a transmitter power-on message reporting the power-on of the transmitter to a femto base station controller, and in step 1007, operates a timer. At this point, the transmitter power-on message includes a PCID and a GCID of the femto base station itself and an ID of the UE.

In step 1009, the femto base station determines whether the timer expires. When the timer does not expire, the femto base station determines whether a handover procedure start message is received from the femto base station controller in step 1013. When the handover procedure start message is received, the femto base station terminates the operation of the timer and performs a handover procedure with the UE in step 1015, and ends the algorithm according to an exemplary embodiment of the present invention.

On the other hand, when the handover procedure start message is not received, the femto base station determines whether a transmitter power off indicate message is received from the femto base station controller in step 1017. When the transmitter power off indicate message is not received, the femto base station returns to step 1009 and performs subsequent steps again. On the other hand, when the transmitter power off indicate message is received, the femto base station terminates the operation of the timer and turns off the power of the transmitter in step 1019, and ends the algorithm according to an exemplary embodiment of the present invention.

On the other hand, when the timer expires, the femto base station turns off the power of the transmitter in step 1011, and ends the algorithm according to an exemplary embodiment of the present invention.

Figure 11:
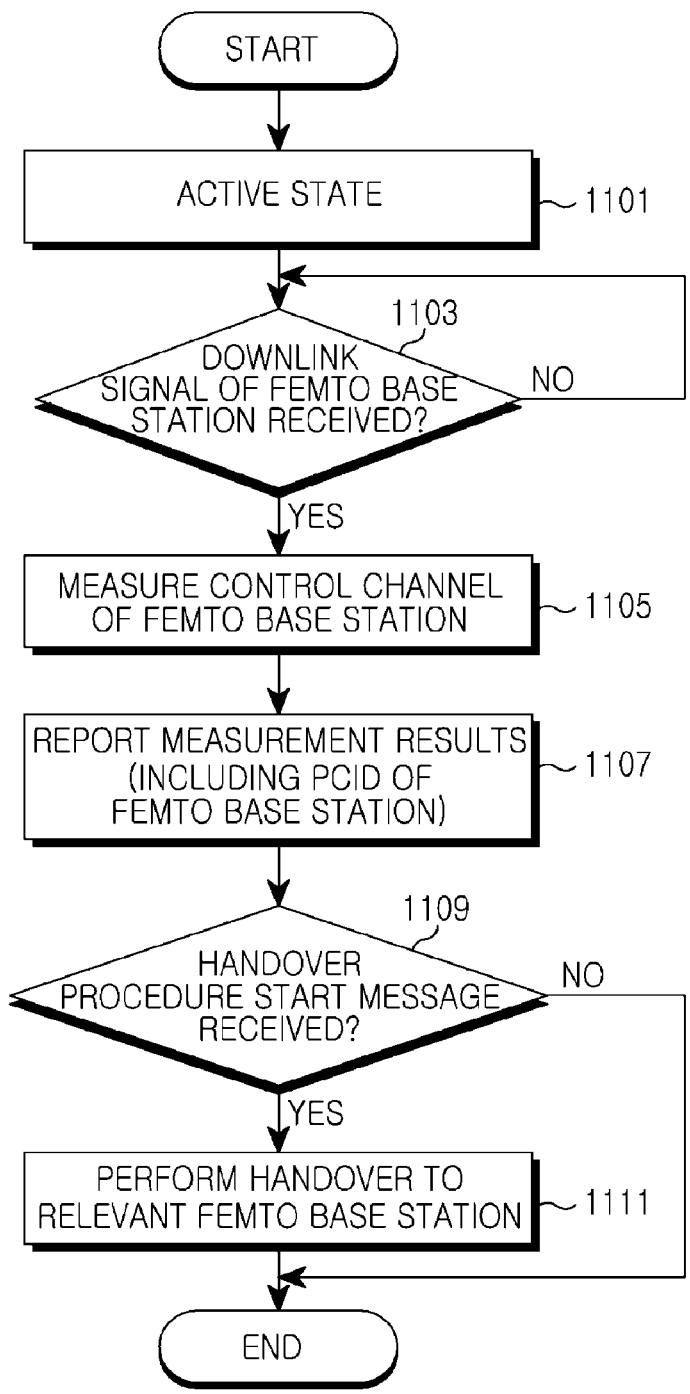
FIG. 11 is a flowchart illustrating an operation procedure of a UE in a broadband wireless communication system according to an exemplary embodiment of the present invention.

FIG. 11 is a flowchart illustrating an operation procedure of UE in a broadband wireless communication system according to an exemplary embodiment of the present invention.

Referring to FIG. 11, when UE enters an active state in step 1101, the UE determines whether a downlink signal is received from a femto base station in step 1103.

When a downlink signal is received from the femto base station, the UE measures the downlink signal via a control channel of the femto base station in step 1105, and transmits a measurement result report message to a macro base station which is a current serving base station of the UE in step 1107. At this point, the measurement result report message includes PCIDs of neighbor base stations and a GCID of femto base stations belonging to a CSG of the UE.

In step 1109, the UE determines whether a handover procedure start message is received from the macro base station. When the handover procedure start message is not received, the UE ends the algorithm according to an exemplary embodiment of the present invention. On the other hand, when the handover procedure start message is received, the UE performs a handover to a relevant femto base station in step 1111, and ends the algorithm according to an exemplary embodiment of the present invention.

Figure 12:
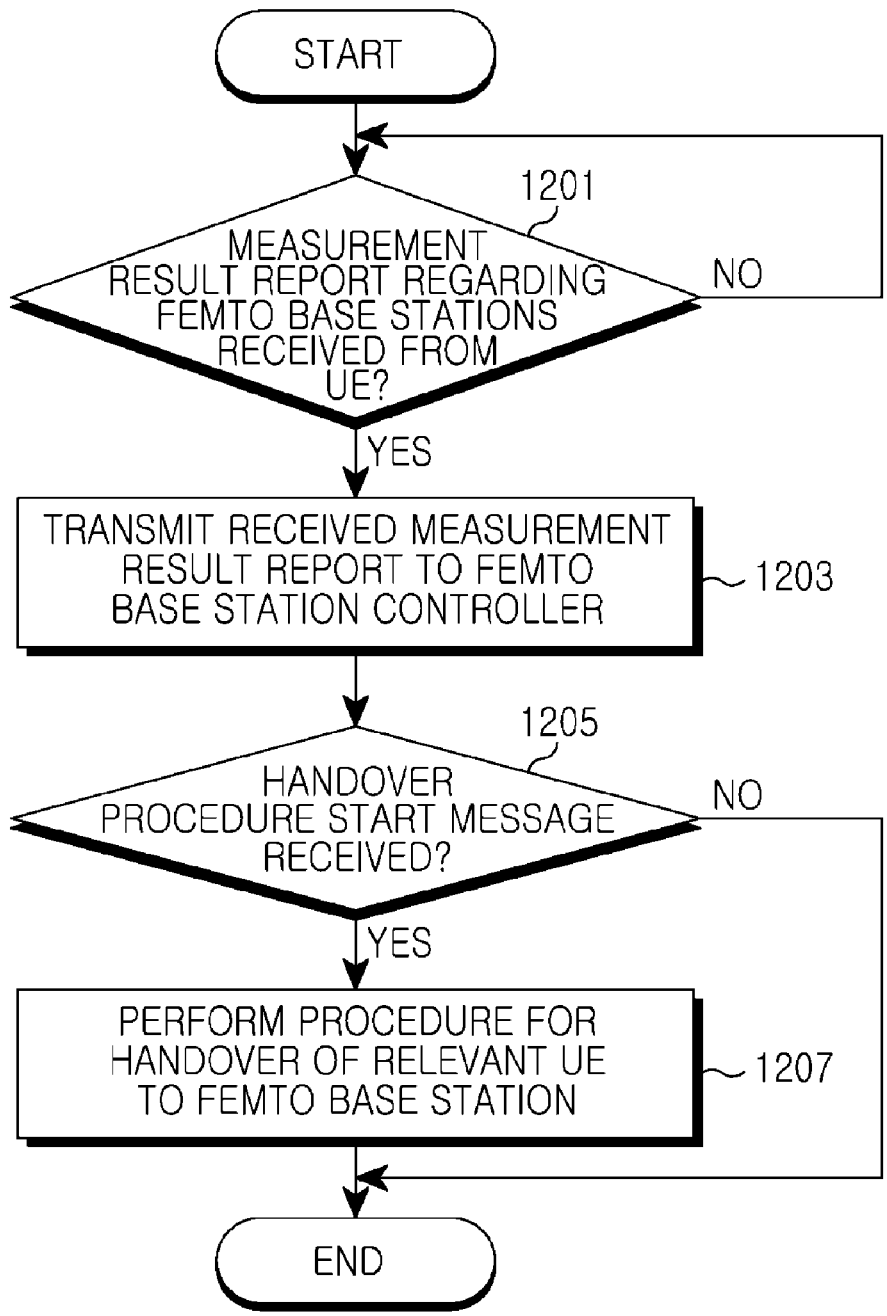
FIG. 12 is a flowchart illustrating an operation procedure of a macro base station in a broadband wireless communication system according to an exemplary embodiment of the present invention.

FIG. 12 is a flowchart illustrating an operation procedure of a macro base station in a broadband wireless communication system according to an exemplary embodiment of the present invention.

Referring to FIG. 12, in step 1201, the macro base station determines whether a measurement result report message of a femto base station is received from UE which currently receives a service from the macro base station. Here, whether a measurement result report message is a measurement result report message of a femto base station may be determined using a PCID included in the measurement result report message.

When the measurement result report message of a femto base station is received, the macro base station transmits the received measurement result report message to a femto base station controller in step 1203, and determines whether a handover procedure start message is received from the femto base station in step 1205.

When the handover procedure start message is received from the femto base station, the macro base station transmits a message informing a handover to the femto base station to the UE in step 1207, and ends the algorithm according to an exemplary embodiment of the present invention. On the other hand, when the handover procedure start message is not received from the femto base station, the macro base station ends the algorithm according to an exemplary embodiment of the present invention.

Figure 13:
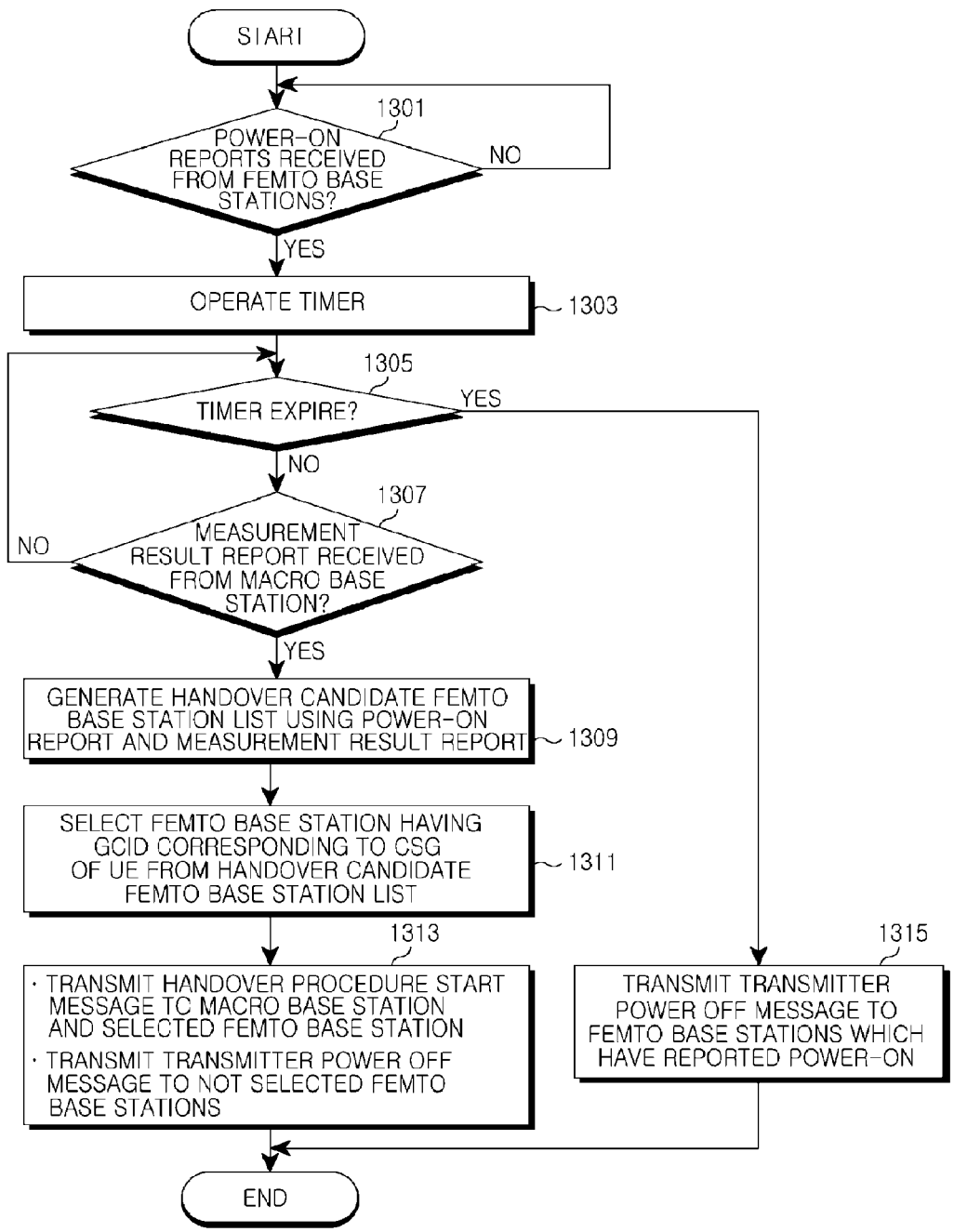
FIG. 13 is a flowchart illustrating an operation procedure of a femto base station controller in a broadband wireless communication system according to an exemplary embodiment of the present invention.

FIG. 13 is a flowchart illustrating an operation procedure of a femto base station controller in a broadband wireless communication system according to an exemplary embodiment of the present invention.

Referring to FIG. 13, when transmitter power-on report messages reporting that the power of a transmitter is turned on by a specific UE are received from femto base stations in step 1301, the femto base station controller operates a timer in step 1303, and determines whether the timer expires in step 1305. At this point, the femto base station controller stores information of the femto base stations which have transmitted the transmitter power-on report messages in the storing unit 934.

When the timer does not expire, the femto base station controller determines whether a measurement result report message of the specific UE is received via the macro base station in step 1307. When the measurement result report message of the specific UE is not received, the femto base station controller returns to step 1305 and performs subsequent steps again.

On the other hand, when the measurement result report message of the specific UE is received, the femto base station controller generates a handover candidate femto base station list of the specific UE using the transmitter power-on report message and the measurement result report message in step 1309. That is, the femto base station controller generates the handover candidate femto base station list by detecting PCIDs of femto base stations from the measurement result report message, and then searching for femto base stations having the detected PCIDs from femto base stations stored in the storing unit 934. Here, when the measurement result report message is received, the femto base station controller terminates the timer.

In step 1311, the femto base station controller selects, as a handover target base station, a femto base station having a GCID corresponding to a CSG of the UE from the handover candidate femto base station list. That is, the femto base station controller detects a GCID belonging to the CSG of the UE from the measurement result report message, and then determines, as the handover target base station, the femto base station having the GCID belonging to the CSG of the UE among the femto base stations included in the handover candidate femto base station list illustrated in FIG. 4.

In step 1313, the femto base station controller transmits a handover procedure start message to the macro base station and the femto base station selected as the handover target base station, and transmits transmitter power off indicate messages to femto base stations on the handover candidate femto base station list, which have not been selected as the handover target base station. After that, the femto base station ends the algorithm according to an exemplary embodiment of the present invention.

On the other hand, when the timer expires, the femto base station controller transmits transmitter power off indicate messages to the femto base stations which have transmitted the transmitter power-on report messages in step 1315, and ends the algorithm according to an exemplary embodiment of the present invention.

In the above-described embodiments of the present invention, each UE incorporates a GCID corresponding to the CSG of the UE into a message reporting a downlink signal measurement result, but the GCID corresponding to the CSG of each UE may be stored in advance in the femto base station controller.

According to exemplary embodiments of the present invention, during a handover of UE in a broadband wireless communication system, a femto base station which becomes a handover target base station of the UE is identified using a measurement result report message of the UE and report messages of femto base stations, and transmitter power of femto base stations which are not handover target base stations is turned off fast, so that an amount of interference with respect to neighbor macro base stations and femto base stations may be reduced.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

The invention claimed is:

1. A method of a femto base station, for controlling transmitter power of the femto base station in a broadband wireless communication system, the method comprising:
   receiving a signal from User Equipment (UE), and turning on power of a transmitter of the femto base station, if a strength of the received signal is greater than or equal to a threshold;
   transmitting a power-on report message reporting power-on of the transmitter to a femto base station controller; and
   receiving a transmitter power off indicate message from the femto base station controller.

2. The method of claim 1, wherein the power-on report message comprises at least one of a Physical Cell IDentifier (PCID) and a Global Cell IDentifier (GCID) of the femto base station.

3. The method of claim 1, further comprising:
   starting a timer for measuring predetermined duration, if the power of the transmitter is turned on;
   detecting whether a transmitter power off indicate message is received before the timer expires;
   when the message is received before the timer expires, terminating the timer and performing an operation corresponding to the received message, and
   when the timer expires without reception of the message, turning off the power of the transmitter.

4. A method of a femto base station controller, for controlling transmitter power of a femto base station in a broadband wireless communication system, the method comprising:
   receiving a first message reporting that power of a transmitter of the femto base station is turned-on by User Equipment (UE) from the femto base station;
   receiving a second message reporting downlink measurement results of femto base stations from the UE via a macro base station;
   generating a handover candidate base station list using Physical Cell IDentifiers (PCIDs) included in the first message and the second message;
   determining, as a handover target base station, a femto base station having a Global Cell IDentifier (GCID) corresponding to a Closed Subscriber Group (CSG) of the UE among femto base stations included in the handover candidate base station list; and
   transmitting a handover procedure start message to the macro base station and the determined femto base station.

5. The method of claim 4, further comprising transmitting a transmitter power off indicate message to the other femto base stations except the handover target base station.

6. The method of claim 4, further comprising:
   if the first message is received from the femto base station, starting a timer for measuring predetermined duration; and
   if the second message is not received from the UE before the timer expires, transmitting a transmitter power off indicate message to femto base stations which have reported power-on.

7. A method of User Equipment (UE), for controlling transmitter power of a femto base station in a broadband wireless communication system, the method comprising:
   measuring downlink signals of femto base stations; and
   transmitting a measurement result report message reporting measurement results to a femto base station controller via a macro base station,
   wherein the measurement result report message comprises at least one of Physical Cell IDentifiers (PCIDs) of the femto base stations, and a Global Cell IDentifier (GCID) of femto base stations corresponding to a Closed Subscriber Group (CSG) of the UE,
   wherein a transmitter of a femto base station among the femto base stations is turned on upon receiving a signal having a strength greater than or equal to a threshold from the UE.

8. A method of a macro base station, for controlling transmitter power of a femto base station in a broadband wireless communication system, the method comprising:
   receiving a report message reporting downlink signal measurement results of femto base stations from User Equipment (UE);
   determining whether the report message comprises information regarding a femto base station using a Physical Cell IDentifier (PCID) included in the report message; and
   when the report message comprises the information regarding the femto base station, transmitting the report message to a femto base station controller, to turn off the transmitter power of the femto base station.

9. An apparatus of a femto base station, for controlling transmitter power of a femto base station in a broadband wireless communication system, the apparatus comprising:

a receiver for receiving a signal from User Equipment (UE) or a femto base station controller; a transmitter for transmitting a signal to the UE or the femto base station controller, power of the transmitter being turned on/off; and a controller for turning on the power of the transmitter if a strength of the received signal is greater than or equal to a threshold, transmitting a power-on report message reporting power-on of the transmitter to the femto base station controller, and when a transmitter power off indicate message is received from the femto base station controller, turning off the power of the transmitter.

10. The apparatus of claim 9, further comprising a timer for measuring predetermined duration,
wherein the controller starts the timer if the power of the transmitter is turned on, determines whether the transmitter power off indicate message is received before the timer expires, when the message is received before the timer expires, terminates the timer and performs an operation corresponding to the received message, and when the timer expires without reception of the messages, turns off the power of the transmitter.

11. An apparatus of a femto base station controller, for controlling transmitter power of a femto base station in a broadband wireless communication system, the apparatus comprising:
a receiver for receiving a first message reporting that power of a transmitter of the femto base station is turned on by User Equipment (UE) from the femto base station, and receiving a second message reporting downlink measurement results of femto base stations from the UE via a macro base station;
a controller for generating a handover candidate base station list using Physical Cell IDentifiers (PCIDs) included in the first message and the second message, and determining, as a handover target base station, a femto base station having a Global Cell IDentifier (GCID) corresponding to a Closed Subscriber Group (CSG) of the UE among femto base stations included in the handover candidate base station list.

12. The apparatus of claim 11, wherein the transmitter transmits a transmitter power off indicate message to the other femto base stations except the femto base station determined as the handover target base station.

13. The apparatus of claim 11, further comprising a timer for measuring predetermined duration, wherein the controller starts the timer when the first message is received from the femto base station, when the second message is not received before the timer expires, controls the transmitter to a transmitter power off indicate message to femto base stations which have reported power-on.

14. An apparatus of User Equipment (UE), for controlling transmitter power of a femto base station in a broadband wireless communication system, the apparatus comprising:
a receiver for measuring downlink signals of femto base stations; and
a controller for performing control to generate a measurement result report message reporting measurement results and transmit the measurement result report message to a femto base station controller via a macro base station,
wherein the measurement result report message comprises at least one of Physical Cell IDentifiers (PCIDs) of the femto base stations, and a Global Cell IDentifier (GCID) of femto base stations corresponding to a Closed Subscriber Group (CSG) of the UE,
wherein a transmitter of a femto base station among the femto base stations is turned on upon receiving a signal having a strength greater than or equal to a threshold from the UE.

15. An apparatus of a macro base station, for controlling transmitter power of a femto base station in a broadband wireless communication system, the apparatus comprising:
a receiver for receiving a measurement result report message reporting downlink signal measurement results of femto base stations from User Equipment (UE);
a controller for determining whether the measurement result report message comprises information regarding a femto base station using a Physical Cell IDentifier (PCID) included in the measurement result report message; and
a transmitter for, when the measurement result report message comprises the information regarding the femto base station, transmitting the measurement result report message received from the UE to the femto base station controller under control of the controller, to turn off the transmitter power of the femto base station.

16. The apparatus of claim 9, wherein the power-on report message comprises at least one of a Physical Cell IDentifier (PCID) and a Global Cell IDentifier (GCID) of the femto base station.

* * * * *